April 7, 1931.  M. F. BERG  1,799,579

CLOTH CUTTING MACHINE

Filed Oct. 30, 1929

Inventor:
MORRIS F. BERG.
By Martin P. Smith
Attorney.

Patented Apr. 7, 1931

1,799,579

UNITED STATES PATENT OFFICE

MORRIS F. BERG, OF LOS ANGELES, CALIFORNIA

CLOTH-CUTTING MACHINE

Application filed October 30, 1929. Serial No. 403,502.

My invention relates to a cloth cutting machine that is particularly designed for use in cutting or trimming cloth or fabric of irregular shapes and sizes, into sections of uniform or regular size, for use as wiping cloths in garages, machine shops and the like.

In the reclamation or salvaging of usable products from waste materials, there is always a certain percentage of fabric and cloth which when cleansed and cut to proper size, may be economically employed as wiping cloths by mechanics in machine shops, garages and the like and, it is the purpose of my invention to provide a relatively simple, practical and inexpensive machine that may be conveniently used for cutting reclaimed pieces of cloth and fabric into shape for use as wiping cloths, and further, to provide a machine of the character referred to, with means which may be conveniently operated for sharpening the edge of the rotary cutter without necessitating the removal of said cutter from the machine.

Further objects of my invention are, to provide a cloth cutting machine that may be operated without danger of injury to the operator's hands while the cloth is being trimmed or while the rotary cutter is being sharpened, and further, to provide the machine with an attachment whereby buttons may be very rapidly cut from the pieces of cloth or fabric that are acted upon by the machine.

With the foregoing and other objects in view, my invention consists in certain novel features of construction and arrangement of parts that will hereinafter be more fully described and claimed and illustrated in the accompanying drawings, in which:

Figure 1:
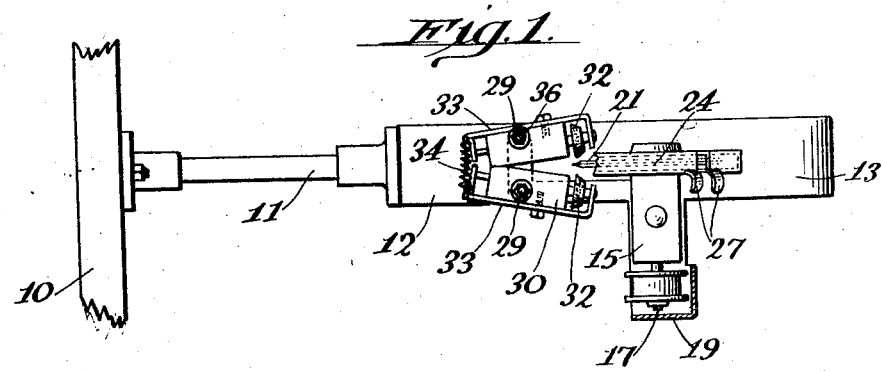
Fig. 1 is a top plan view of a cutting machine constructed in accordance with my invention.
Figure 2:
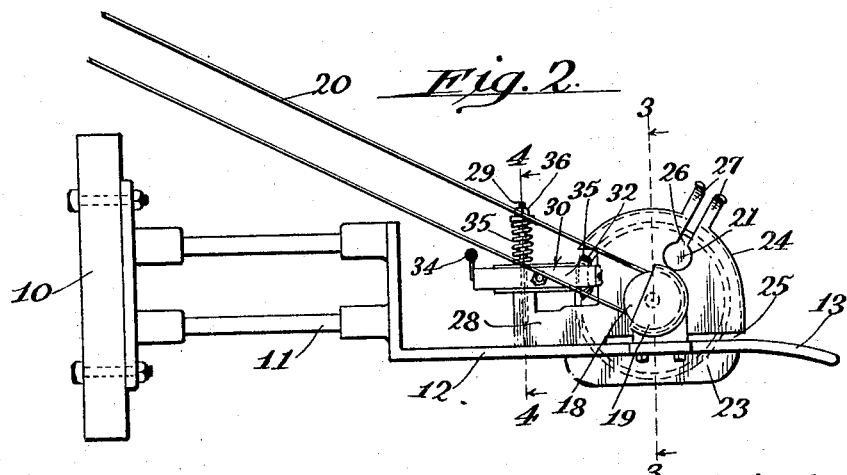
Fig. 2 is a side elevational view of the cutting machine.
Figure 3:
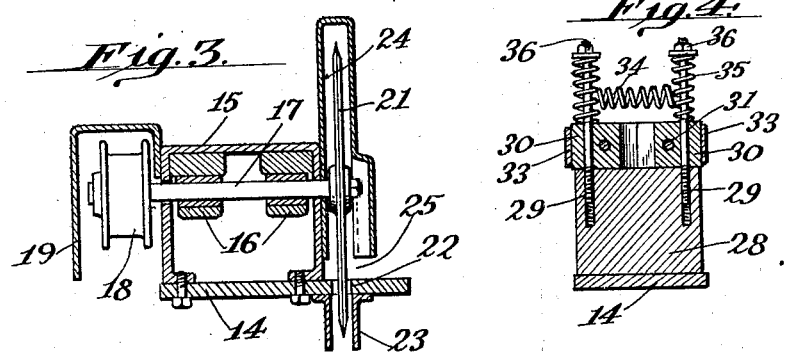
Fig. 3 is an enlarged vertical section taken approximately on the line 3—3 of Fig. 2.
Figure 4:
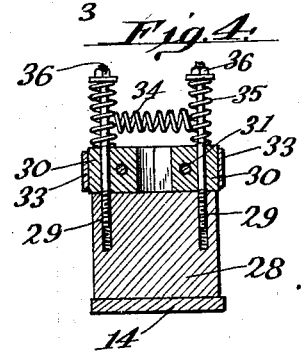
Fig. 4 is an enlarged vertical section taken approximately on the line 4—4 of Fig. 2.

Referring by numerals to the accompanying drawings which illustrate a practical embodiment of my invention, 10 designates a suitable support to which is secured a horizontally disposed bracket 11 and projecting forwardly from the front end of said bracket is a plate 12 having its forward portion 13 curved gradually downward to form a convenient work support or table.

Projecting laterally from plate 12 to the rear of the work support 13 is a horizontally disposed plate 14 and detachably mounted thereupon is a housing 15 within which is arranged suitable bearings 16 for a horizontally disposed shaft 17.

Fixed on the outer end of shaft 17 is a pulley 18, the entire front portion of which is enclosed by a suitable housing or guard 19 and operating around pulley 18 is a power driven belt 20.

Detachably secured to the inner end of shaft 17 is a cutting disc 21 having a sharp edge and the peripheral portion of this disc operates through a slot 22 that is formed in work table 13.

Secured in any suitable manner to the underside of the work table and enclosing that portion of the cutting disc that projects below the table is a guard housing 23.

Detachably secured on top of the work table and enclosing the disc 21 is a guard housing 24 and a portion thereof immediately above the work table is cut away so as to form a narrow slot 25 between said work table and the lower edge of said housing which slot enables the cloth that is being cut on the machine to be moved inwardly into engagement with the edge of disc 21.

Formed in the upper portion of one of the left hand side walls of guard housing 24 is a short radially disposed slot 26 and projecting upwardly from the housing immediately in front of and to the rear of the slot are fingers 27, the upper ends of which are curved outwardly. The slot and finger arrangement just described is for the purpose of enabling buttons to be readily cut from material that is being operated on by the machine.

Secured to and projecting upwardly from plate 12, immediately to the rear of housing 24, is a block 28, and seated therein, adjacent to its ends, are upwardly projecting pins 29. Pivotally mounted on these pins at points intermediate their ends, are blocks 30 in which are journalled shafts 31, the same extending lengthwise through said blocks and secured on the forward portions of these shafts are small wheels or discs 32 of abrasive material. The peripheries of these abrasive wheels are slightly beveled.

Secured to the outer faces of the pivotally mounted blocks 30 are straps 33 having inturned end portions and which latter receive and serve as bearings for the ends of the shafts 31 that project beyond the blocks 30.

Connecting the rear ends of the straps 33 is a rectractile coil spring 34. The pins 21 project above the blocks 30 and arranged on said projecting portions are expansive coil springs 35, the lower ends of which bear on top of the blocks 30 and the upper ends of these springs bear against washers that are arranged beneath nuts 36 that are mounted on the threaded upper ends of the pins.

In the use of my improved cutting machine the cloth or fabric to be cut is placed on table 13 and moved rearwardly through the slot 25 until engaged by the edge of disc 21 and which disc it will be understood is rotated at a comparatively high rate of speed by means of the belt 20 which passes around pulley 18.

The sharp edge of the disc very rapidly cuts the cloth or fabric and the operator is able to very quickly trim off the rough or uneven edges of a section of cloth or fabric so as to produce a cloth that has a marketable value as a wiping cloth to be used by mechanics in machine shops, garages and the like.

In the event that the piece of cloth or fabric that is being cut or trimmed has buttons attached thereto, said buttons may be very quickly removed by manipulating the cloth so that the portion thereof adjacent to the buttons or the threads that attach the buttons to the cloth are moved downwardly through slot 26 between the fingers 27 with the buttons on one side of said fingers and the cloth on the other side and when the cloth or the attaching threads are engaged by the edge of the cutting disc 21, said buttons will be cut from the cloth or fabric.

The rear portion of guard housing 24 is cut away, as designated by 35, for the accommodation of the disc sharpening wheels 32 and the height of block 28, is such that the blocks 30 carrying the shafts 31 are positioned a short distance above the horizontal plane occupied by the axis of the disc 21. Thus the beveled edges of the sharpening wheels 32 engage the edge of the cutting disc on a tangent, in a plane a short distance above the plane occupied by the axis of disc 21 and which arrangement is necessary in order that the abrasive wheels will produce the desired sharpening results when moved into contact with the cutting wheel and which contact results in a driving engagement between said cutting wheel and the abrasive wheels.

In order to sharpen the edge of the cutting disc, the operator engages the forward end of one of the straps 33 and moves same inwardly until the corresponding abrasive wheel engages the edge of the cutting wheel and during this action the retractile action of spring 34, swings the forward end of the other one of the blocks 30 outwardly a short distance so that there is no possibility of contact of the corresponding abrasive wheel 32 with the cutting disc. After one side of the edge of the cutting disc has been sharpened by engagement of one of the abrasive wheels as just described, the other one of said abrasive wheels is moved into contact with the cutting disc so as to sharpen the edge thereof.

Thus it will be seen that the sharpening of the cutting disc may be effected very quickly and without removing said cutting disc or any parts of the machine.

Thus it will be seen that I have provided a cloth cutting or trimming machine that is relatively simple in construction, inexpensive of manufacture and which may be advantageously and economically employed in the reclamation of fabric, which when cut and trimmed to proper shape, are applicable for use as wiping cloths and the like.

It will be understood that minor changes in the size, form and construction of the various parts of my improved cloth cutting machine may be made and substituted for those herein shown and described without departing from the spirit of my invention, the scope of which is set forth in the appended claims.

I claim as my invention:

1. In a cloth cutting machine, a table, a shaft journaled on said table, a cutting disc mounted on said shaft, a support on the table to the rear of said cutting disc, blocks pivotally mounted on top of said support, shafts journaled in said pivotally mounted blocks, abrasive wheels carried by the forward ends of said shafts, a retractile spring connected to the rear ends of said blocks for normally spreading the forward ends of said blocks apart and expansive springs bearing on top of said pivotally mounted blocks.

2. In a cloth cutting machine, a table, a shaft journaled on said table, a cutting disc carried by said shaft, a support on the table to the rear of said cutting disc, pins seated in said support and projecting upwardly therefrom, blocks journaled on said pins, expansive springs arranged on the upper portions of said pins and bearing on top of said blocks, a shaft journaled in each block, an abrasive wheel carried by the forward end of each shaft and a retractile spring connected to the rear portions of the blocks for normally spreading the forward portions of the blocks apart.

In testimony whereof, I affix my signature.

MORRIS F. BERG.